June 24, 1969 S. O. BECK 3,451,366

TAPE MONOGRAMMER

Filed June 30, 1967 Sheet 1 of 2

Sidney O. Beck
INVENTOR.

BY Dominik, Stein + Knechtel
ATTORNEYS

TAPE MONOGRAMMER

Filed June 30, 1967

Sidney O. Beck
INVENTOR.

BY Dominik, Stein & Knechtel
ATTORNEYS 3,451,366
TAPE MONOGRAMMER
Sidney O. Beck, 6809 S. MacDill Ave., Tampa, Fla. 33611
Filed June 30, 1967, Ser. No. 650,426
Int. Cl. D05c 3/02, 7/04
U.S. Cl. 112—102 3 Claims

ABSTRACT OF THE DISCLOSURE

A monogrammer for copying a monogram, design, etc. and stitching it into fabric, particularly tape. It consists of a two-tiered table with a pantograph, stylus and stencil on the lower tier, and a holder, workframe, sewing machine, motor and needle positioner on the top tier. As the stylus follows the stencil, the workframe is moved beneath the head of the operating sewing machine to effect stitching of the monogram, design, etc. onto the workpiece.

This invention relates to a fabric monogrammer and more particularly to apparatus for copying a monogram or the like and stitching a duplicate thereof in fabric, particularly tape.

There are a number of monogramming machines currently known and some of these are being used commercially. None are particularly satisfactory, especially where the operator or maintenance man is relatively unskilled. In most instances, a complicated, costly machine, difficult to operate and maintain, and limited in its scope, is involved. For example, in U.S. 2,597,686, a complicated pantograph with a stylus based on a bank of electrical lamps and light directional means is required to effect design reproduction. Such apparatus requires skilled labor to operate and to maintain it and is evidently costly to purchase. Likewise, in U.S. 2,624,302, an even more complicated pantograph coupled to a means for exerting resistance to the movements of the pantograph and a battery of signal lights with appropriate switching therefor is required. Such a device is difficult to service because of its complexity, is difficult to operate properly especially by unskilled help because of its resistance and light systems, and is obviously high priced. U.S. 2,672,110 does away with the need for a stylus lighting arrangement and instead utilizes a detailed pantograph support and a stylus support which are evidently costly to purchase, install and maintain. U.S. 2,806,440 requires a novel movable parallelogram type pantograph, a stitch plate and a method of initial and continued operation difficult to grasp by the unskilled operator usually found in this rare industry. U.S. 3,001,489 teaches a novel approach to pantograph elimination but upon studying the substitute therefor, one must conclude that the substitution involves a replacement of one complicated mechanism by another complicated mechanism, both of which are difficult to understand, operate and maintain.

An object of this invention is to provide a novel design reproducing machine.

Another object is to provide a machine of the above character which is extremely simple in structure.

Still another object is to provide a machine of the above character which is fairly moderate in cost.

A further object is to provide a machine of the above character which is relatively easy to maintain.

A still further object is to provide a machine of the above character, the operation of which is relatively easy to understand, whereby unskilled help can be employed to operate it.

Another object is to provide a machine of the above character useful for quick design reproduction.

Another object is to provide a machine of the above character useful for quick and continuous embroidery or monogramming.

Another object is to provide a machine of the above character which merely utilizes a mechanical stylus and is nevertheless accurate in its design reproducing abilities.

Another object is to provide a design reproduction method wherein said machine may function efficiently and with minimum maintenance.

Other objects of the invention will in part be obvious and will in part appear hereinafter.

In accord with the above objectives, it has now been found that monogramming can be efficiently attained with minimal skilled labor by the use of an adjustable supported parallelogram type pantograph of simple design, one arm of which terminates in a stylus and a second arm of which controls a movable support for the workframe, said workframe holding the workpiece up to a sewing machine head, the sewing machine of which is operated in a manner whereby the needle of the sewing head is positioned out of engagement with the workpiece whereby the workpiece and the workframe may be separately manipulated to enable rapid repeat operation.

More particularly, the apparatus of this invention consists of a two-tiered table to which a pivotable parallelogram is secured on top of the lower tier, while the sewing machine is secured to the top of the upper tier. One arm of the parallelogram comprises the stylus which engages stencils of desired configuration. The arm and its adjacent arm of the parallelogram is pivotally secured to the lower tier. The apex removed from the apex of said arms is connected to a freely longitudinal and freely latitudinal moving support slidably secured to the top of the upper tier. A workframe is secured to said support. It is positioned underneath the sewing head. It moves in accord with the movement of the parallelogram. Changes or adjustments in movement are possible simply by changing the arms of the parallelogram to decrease or increase its size.

The sewing machine is powered by a continuously operating motor having a clutch and brake mechanism. A treadle controls the operation of the clutch and brake mechanism. Interconnected between the latter and the sewing machine is a needle positioner which acts to lift the needle from the workpiece. Thus, the needle of the sewing head is placed out of engagement with the workpiece whenever the pedal is released. If desired, a bobbin winder can be incorporated into the apparatus to provide thread-filled bobbins for the sewing head.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Similar reference characters refer to similar parts throughout the several views of the drawing.

Figure 1:
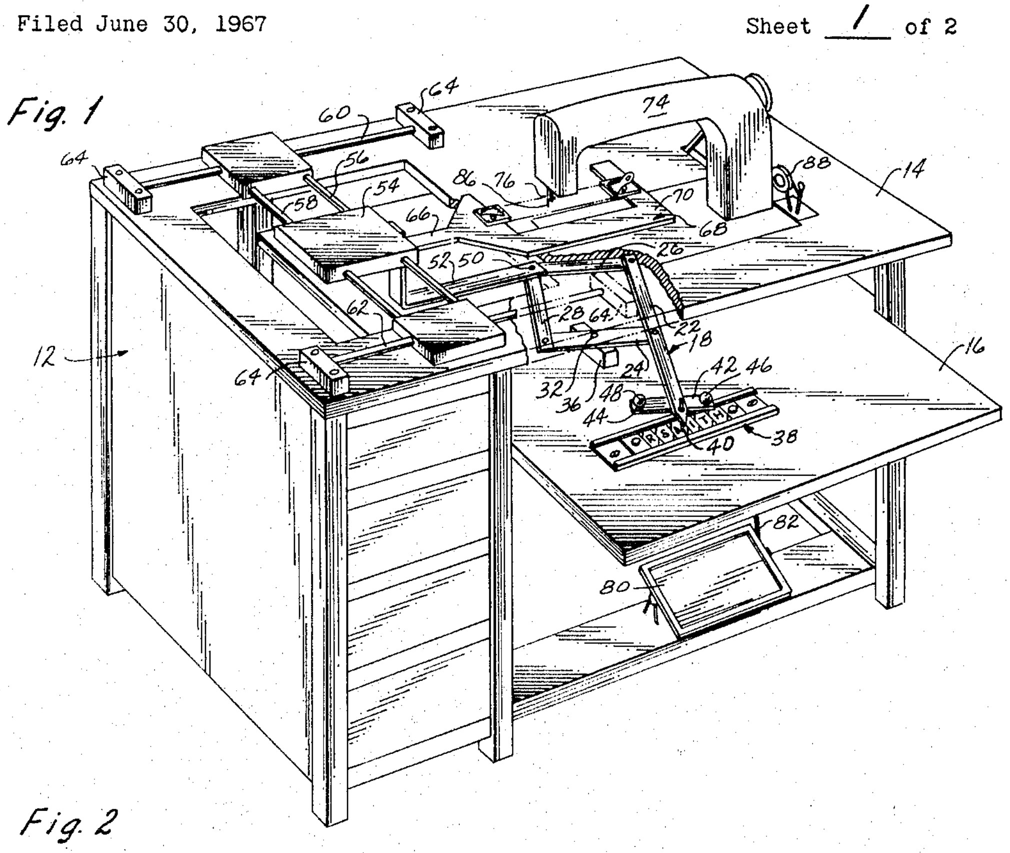
FIG. 1 is a perspective view of the apparatus of this invention.
Figures 3, 4, 5:
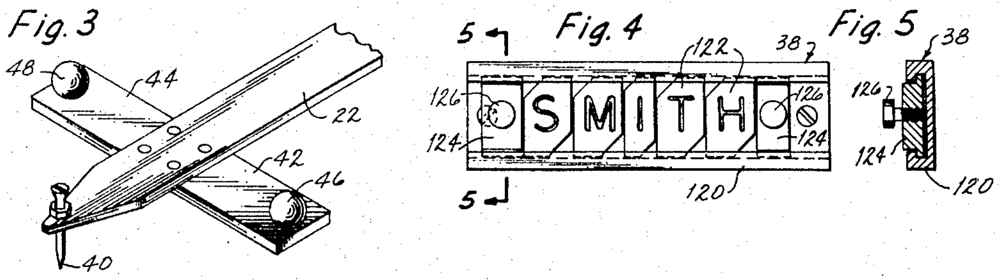
FIG. 3 is a perspective view of the stylus.
FIG. 4 is a top plan view of the stencil.
FIG. 5 is a cross-sectional view of the stencil taken along lines 5—5 of FIG. 4.

Referring to FIGS. 1 and 3 specifically, the apparatus comprises a table 12 with an upper tier 14 and a lower tier 16. Affixed between the upper and the lower tier is a pantograph 18. It consists of a parallelogram 20 having four arms 22, 24, 26, and 28, each pivotable at its ends to the adjacent arms. Arm 24 is pivoted at lower tier pivot 32 upon the lower tier 16 via parallelogram spacer block 36. The block merely functions to space the parallelogram above the top surface of the lower tier for easier operation.

Arm 22 extends toward a stencil 38 and has a stylus 40 (see FIG. 3) affixed at its end to engage the stencil. Wing handles 42 and 44 with stylus knobs 46 and 48 thereon aid in manipulating stylus 40.

A guide pivot 50 between arms 26 and 88 of the parallelogram affixed to the end of a longitudinal-latitudinal guide 52 transmits the open-close movements of the parallelogram to the guide. The guide is composed of a level block 54 which slides on latitudinal slide bars 56 and 58. These bars, in turn, slide on longitudinal slide bars 60 and 62. The ends of bars 60 and 62 are affixed to the upper tier via four slide bar supports 64.

Figure 6:
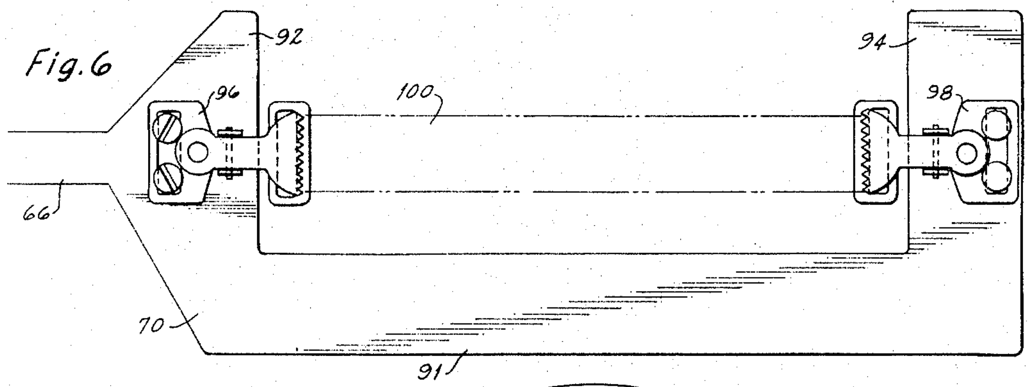
FIG. 6 is a top plan view of one embodiment of a workholder useful for continuous tape monogramming.
Figure 7:
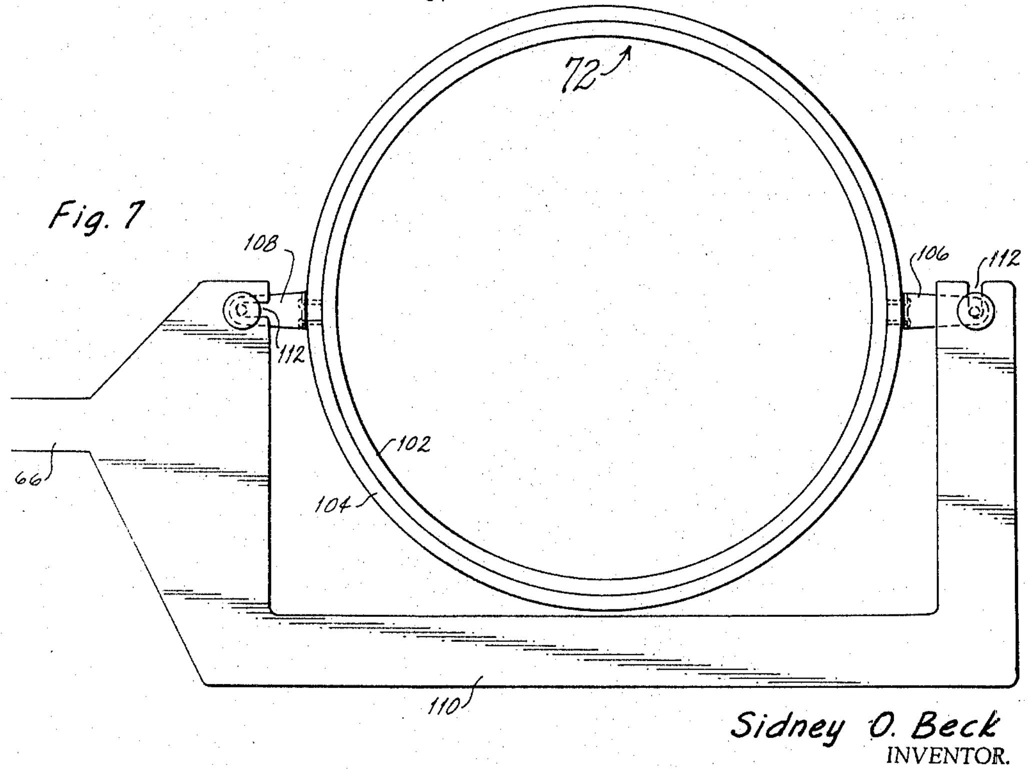
FIG. 7 is a top plan view of another embodiment of a workholder useful for embroidery.

Level block 54 is connected via workframe arm 66 to a workframe 68. The workframe may comprise a tape holder 70, such as seen in detail in FIG. 6, or a hoop 72, such as seen in FIG. 7. Both are described in detail below. The workframe holds the tape or fabric or other sheet material to be stitched by sewing machine 74.

Machine 74 is of standard design and therefore is not described here in detail. It may be selected to effect a straight stitch or a lateral stitch or a zig-zag stitch or any other of the many known stitches. Indeed, it may be adjustable to effect all of said stitches. A needle foot 76 is used to avoid breakage of thread and is appropriately designed to enable the stitch desired.

Figure 2:
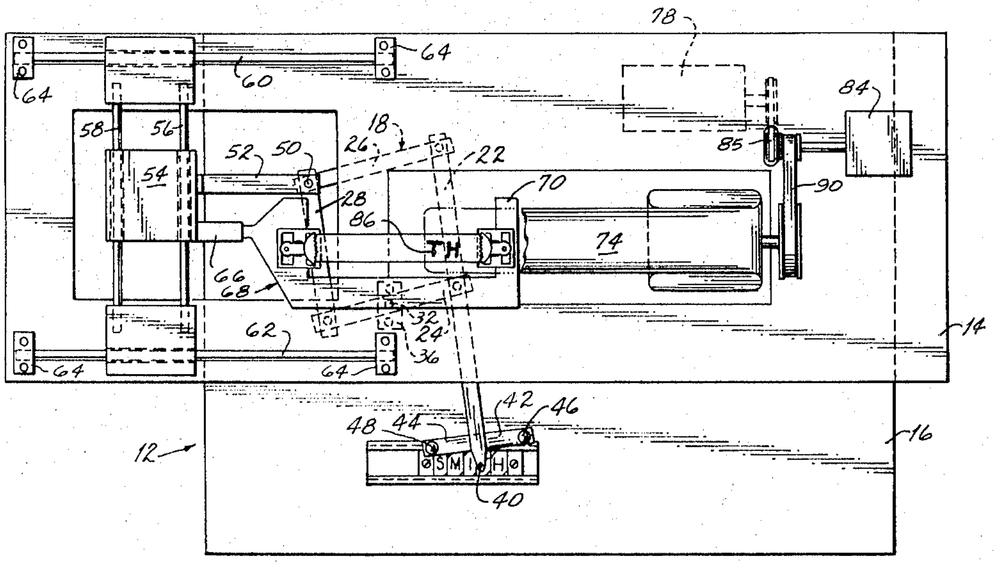
FIG. 2 is a top plan view of the lower tier with the upper tier and its element shown in shadow.

The machine 74 is powered via electrical motor 74 (see FIG. 2). Once started, the motor is continuously run by supply of electrical power. A clutch and brake mechanism (not shown), operated by treadle 80, via treadle rod 82, controls the application of power from the motor to the sewing machine.

A needle positioner 84, of standard clutch and brake design, is interposed between said clutch and brake mechanism of said motor 78 and said sewing machine 74. The positioner functions to lift the needle out of engagement with the workpiece whenever power is stopped to the sewing machine. Treadle 80 also controls operation of the needle positioner 84 via a switch on the treadle rod 82. Thus, to advance the tape, if the latter comprises the workpiece, or manipulate the fabric or sheet, without breakage of the needle, the operator need merely apply heel pressure on the treadle which actuates the switch on the treadle rod which, in turn, causes operation of the needle positioner to lift the needle from the workpiece.

Positioner 84 is interposed between the motor 78 via gears 85 and the sewing machine via endless belt 90.

A bobbin winder 88, of customary design, may also be coupled to belt 90 for use in winding the necessary bobbins for the sewing machine.

The workframe may take on various structural forms. Of such, the two preferred ones are shown in FIGS. 6 and 7. The workframe in FIG. 6 comprises a tape holder 70. It has a U-shaped body 91 with arms 92 and 94 upon which are affixed spring clips 96 and 98, respectively. The tape 100 to be embroidered spans between clips 96 and 98. There is nothing underneath the tape so that the needle 86 from the head of the sewing machine can directly penetrate the tape to form the desired name, initial, monogram, etc. in accord with the stencil being followed by the pantograph.

The workframe in FIG. 7 comprises two concentric hoops 102 and 104, hoop 102 telescopingly fitting within hoop 104 in a friction fit. Such fit enables the grasping of fabric or other sheet between the hoops. Outer hoop 104 is secured via hoop straps 106 and 108 and bolts 112 to a U-shaped hoop support 110. Hoop support 110 connects to workframe arm 66. Bolts 112 are designed to be easily disengageable from the hoop support 110 to facilitate manipulation of the hoops and the workpiece.

The stencil and stylus means are shown in FIGS. 3 to 5. It comprises a channel slide 120 into which the desired stencil pattern pieces are inserted. In the case shown, the stencil pattern comprises a plurality of letters on individual tabs 122 held within the slide via end stops 124. The end stops bolt to the slide, thereby acting as stops, via bolts 126. The letters on the tabs 122 are actually grooved into each tab. Stylus 40 is ridden within much grooved patterns by the operator of the machine of this invention and the workframe is caused to follow the pattern effected while the sewing head merely continues to sew the stitch it is capable of making.

To operate the apparatus of this invention, the operator selects the pattern to be copied. In the instance shown in FIG. 4, the name Smith has been selected by picking individual tabs 122 which spell out the name. An end stop 124 is inserted into channel slide 120 followed by insertions of the selected tabs 122 and then by another end stop 124.

A workpiece tape, in continuous form, in this instance, is spanned between spring clips 96 and 98 of the tape holder.

Thread of the desired color is then threaded into sewing machine 74 including its bobbin. The machine is adjusted to make lateral stitches and a needle foot 76, enabled to make such a lateral stitch, is preferably inserted into the sewing head to prevent thread breakage. Power is supplied to motor 78 and the operator uses her foot to actuate the brake and clutch mechanism of motor 78 via treadle 80. As she does so, she manipulates stylus 40 via wing handles 42 and 44 through the grooved letters of the tabs 122.

In doing so, the pantograph 18 transmits the operator's movements of the stylus to the level block 54. The arms of the parallelogram 20 pivot in a manner whereby pivot 50 has a longitudinal and latitudinal movement in accord with the letters of the tabs 122. Such movement of pivot 50 moves level block 54 in similar fashion and its motion is transmitted via workframe arm 66 to the tape holder 70. Thus the sewing machine embroiders a name onto the tape.

When the name has been embroidered, clips 96 and 98 are opened and the continuous length of tape advanced for a similar operation. In this manner, a continuous length of tape with the embroidered name in repetitive fashion is monogrammed therein.

The machine is also useful for embroidering names, initials, designs, insignias, coats of arms and the like onto fabric or other sheet. For example, initials or a coat of arms may be embroidered onto a man's shirt pocket or sleeve or a woman's blouse by clamping the item within the panel of the hoops 102 and 104 of FIG. 7 and using the machine as described above.

It should be evident from the description above that the apparatus of this invention is capable of being operated by even relatively unskilled operators. And the simplicity of the apparatus makes it easy to repair. Indeed, its lack of complicated mechanism and its combination of elements, many of which are stock items currently being marketed, makes it a relatively inexpensive item. The desire of haberdashers and similar mercantile activities can now be satisfied. Monogramming is now possible on an individual scale at low cost.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A monogrammer which requires minimal skilled labor to operate comprising a supported parallelogram-type pantograph, one arm of which terminates in a stylus, said stylus comprising a downwardly extending finger, a stencil into which said stylus projects to follow a pattern therein, said stencil comprising a channel and individual tabs contained and firmly secured within said channel, said tabs having a desired design groove therein, said finger extending into said groove to follow said design, a work frame and movable support therefor to which a second arm of said parallelogram-type pantograph is connected to control movement of said support and said work frame as said stylus is moved, said movable support comprising a level block slidably affixed to latitudinal slide bars, said latitudinal slide bars being slidably affixed to longitudinal bars secured to said monogrammer adjacent said sewing machine whereby latitudinal and longitudinal movement may be imparted to said work frame in a level manner, a sewing machine with a sewing head and a needle, said work frame being positioned under said sewing head to support a work piece to be monogrammed by said needle, motor means to actuate said sewing machine, a needle positioner operatively connected by endless belts between said motor means and said sewing machine to provide needle disengagement of said work piece when operation of said sewing machine is terminated, a table having a lower and an upper tier, said parallelogram-type pantograph and said stylus and said stencil being positioned on said lower tier, and said work frame and said movable support and said sewing machine being positioned on said upper tier of the table with the second arm of said pantograph extending between both tiers.

2. The monogrammer of claim 1 consisting of a tape monogrammer wherein said work frame comprises a U-shaped body, a spring clip attached to each of the arms of said U-shaped body and each capable of grasping and stretching a continuous tape spanned between said arms.

3. The monogrammer of claim 1 for embroidering a fabric wherein said work frame comprises a U-shaped body having first and second arms, two telescopic hoops removably mounted on said U-shaped body, said telescopic hoops being capable of grasping a sheet in the spanned condition, a slot formed on the tip of said first arm of said U-shaped body and a slot formed on the interior side wall of the second arm of said U-shaped body, a pair of bolts affixed to an extension of said telescopic hoops, and said bolts slidably engaging said slots to support the telescopic hoops intermediately of said arms.

References Cited

UNITED STATES PATENTS

| | | | |
|---|---|---|---|
| 1,168,471 | 1/1916 | Berry | 112—103 |
| 1,241,710 | 10/1917 | Corrall et al. | |
| 2,264,779 | 12/1941 | Tillett | 112—102 |
| 2,551,182 | 5/1951 | Tillett et al. | 112—103 |
| 2,624,302 | 1/1953 | Meister | 112—102 |
| 2,939,414 | 6/1960 | Slinn. | |
| 3,001,489 | 9/1961 | Bond et al. | 112—102 X |
| 3,079,880 | 5/1963 | Bihaly | 112—102 X |
| 3,168,882 | 2/1965 | Scholl et al. | 112—103 X |

ALFRED R. GUEST, *Primary Examiner.*